(12) United States Patent
Lee (10) Patent No.: US 7,515,947 B2
(45) Date of Patent: Apr. 7, 2009

(54) FOLDER TYPE MOBILE TERMINAL

(75) Inventor: Choong-Jae Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 10/733,569

(22) Filed: Dec. 12, 2003

(65) Prior Publication Data

US 2004/0121824 A1 Jun. 24, 2004

(30) Foreign Application Priority Data

Dec. 12, 2002 (KR) .................. 10-2002-0079301

(51) Int. Cl.
*H04M 1/00* (2006.01)
(52) U.S. Cl. .................. 455/575.3; 455/566; 455/575.8
(58) Field of Classification Search .............. 455/575.3, 455/575.1
See application file for complete search history.

(56) References Cited

U.S. PATENT DOCUMENTS

| | | | | |
|---|---|---|---|---|
| 5,002,184 | A * | 3/1991 | Lloyd | ......................... 206/305 |
| 5,150,231 | A | 9/1992 | Iwamoto et al. | ............... 349/60 |
| 5,689,824 | A * | 11/1997 | Nagai | ...................... 455/575.3 |
| 5,804,780 | A | 9/1998 | Bartha | |
| 5,933,783 | A | 8/1999 | Kawakami et al. | .......... 455/566 |
| 6,011,699 | A * | 1/2000 | Murray et al. | .............. 361/814 |
| 6,064,453 | A | 5/2000 | Inubushi et al. | ............... 349/58 |
| 6,148,080 | A | 11/2000 | Collin | |
| 6,229,994 | B1 | 5/2001 | Pavet | ......................... 455/90 |
| 6,904,300 | B1 | 6/2005 | Maattanen et al. | |
| 6,957,083 | B2 | 10/2005 | Ikeda et al. | |
| 6,967,280 | B1 | 11/2005 | Boatwright et al. | |
| 7,006,854 | B2 | 2/2006 | Choi | |
| 2001/0049293 | A1 | 12/2001 | Shimazaki | .................. 455/550 |
| 2002/0128053 | A1* | 9/2002 | Jung | .......................... 455/575 |
| 2003/0064638 | A1 | 4/2003 | Fuse et al. | |
| 2004/0038703 | A1* | 2/2004 | Noto et al. | ............... 455/550.1 |
| 2004/0077385 | A1 | 4/2004 | Makino et al. | |
| 2005/0141187 | A1 | 6/2005 | Shimizu | |
| 2006/0110608 | A1 | 5/2006 | Azumi et al. | |

FOREIGN PATENT DOCUMENTS

CN 1233126 10/1999

(Continued)

OTHER PUBLICATIONS

Chinese Office Action dated Nov. 12, 2004.

(Continued)

*Primary Examiner*—Edward Urban
*Assistant Examiner*—Adeel Haroon
(74) *Attorney, Agent, or Firm*—Ked & Associates LLP (57) ABSTRACT

A folder type mobile terminal which prevents damage to a display, such as a liquid crystal display (LCD), mounted in the folder due to an external impact is provided. An impact dispersing device incorporated into the upper and lower covers of the folder portion of the mobile terminal causes a load applied to the upper cover due to an external impact, such as that which is applied when the mobile terminal is dropped, to be dispersed to the lower cover. In this manner, the force of the impact is drawn away from the upper cover, adequate clearance is maintained between the upper cover and the display, and damage to the display is minimized.

23 Claims, 6 Drawing Sheets

FOREIGN PATENT DOCUMENTS

| | | |
|---|---|---|
| CN | 2414554 Y | 1/2001 |
| CN | 2447830 Y | 9/2001 |
| CN | 1375976 | 10/2002 |
| JP | 09-283950 | 10/1997 |
| JP | 2000-194268 | 7/2000 |
| JP | 2001/345898 A | 12/2001 |
| JP | 2004/023610 A | 1/2004 |
| KR | 1998-0057623 | 10/1998 |
| KR | 2001-0027039 | 4/2001 |
| KR | 0038013/2002 | 5/2002 |
| KR | 2002-0066806 | 8/2002 |

OTHER PUBLICATIONS

Korean Office Action dated Oct. 16, 2004.
Korean Office Action dated Oct. 21, 2004.
Korean Office Action dated Oct. 27, 2004.
Chinese Office Action dated Dec. 10, 2004.
Chinese Office Action dated Jun. 1, 2007.

\* cited by examiner

FOLDER TYPE MOBILE TERMINAL

BACKGROUND OF THE INVENTION

1. Field of the Invention

The invention relates to a mobile terminal, and more particularly, to a folder type mobile terminal.

2. Background of the Related Art

Folder type mobile terminals have become very widely used due to a number of advantages associated with them. One such advantage is that a folder type mobile terminal can accommodate a large display, such as a liquid crystal display (LCD), making it easier to view information displayed to a user via the display. For example, newly developed dual LCD folder type mobile terminals which have an LCD mounted not only on an inner side of the folder, but also on an outer side thereof are becoming increasingly popular.

Figure 1:
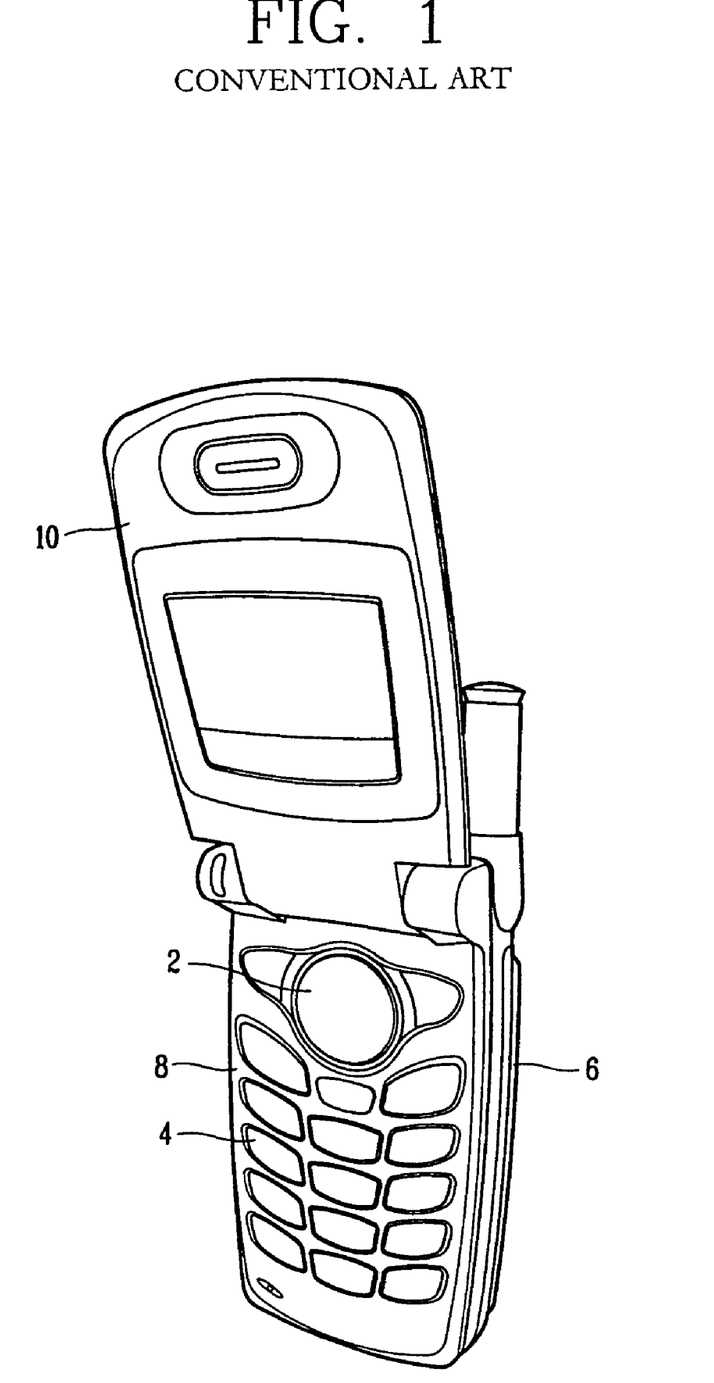
FIG. 1 is a perspective view of a conventional art foldable type mobile terminal.

The conventional art folder type mobile terminal such as that shown in FIG. 1 has a body 8 in which a variety of electric equipment is mounted, a menu button 2 and a number of dial buttons 4 on a front surface thereof, and a battery 6 at a rear surface thereof. A folder portion 10 is rotatably connected to the body 8, and is provided with an LCD which is attached to both an inner side and an outer side thereof.

Figure 2:
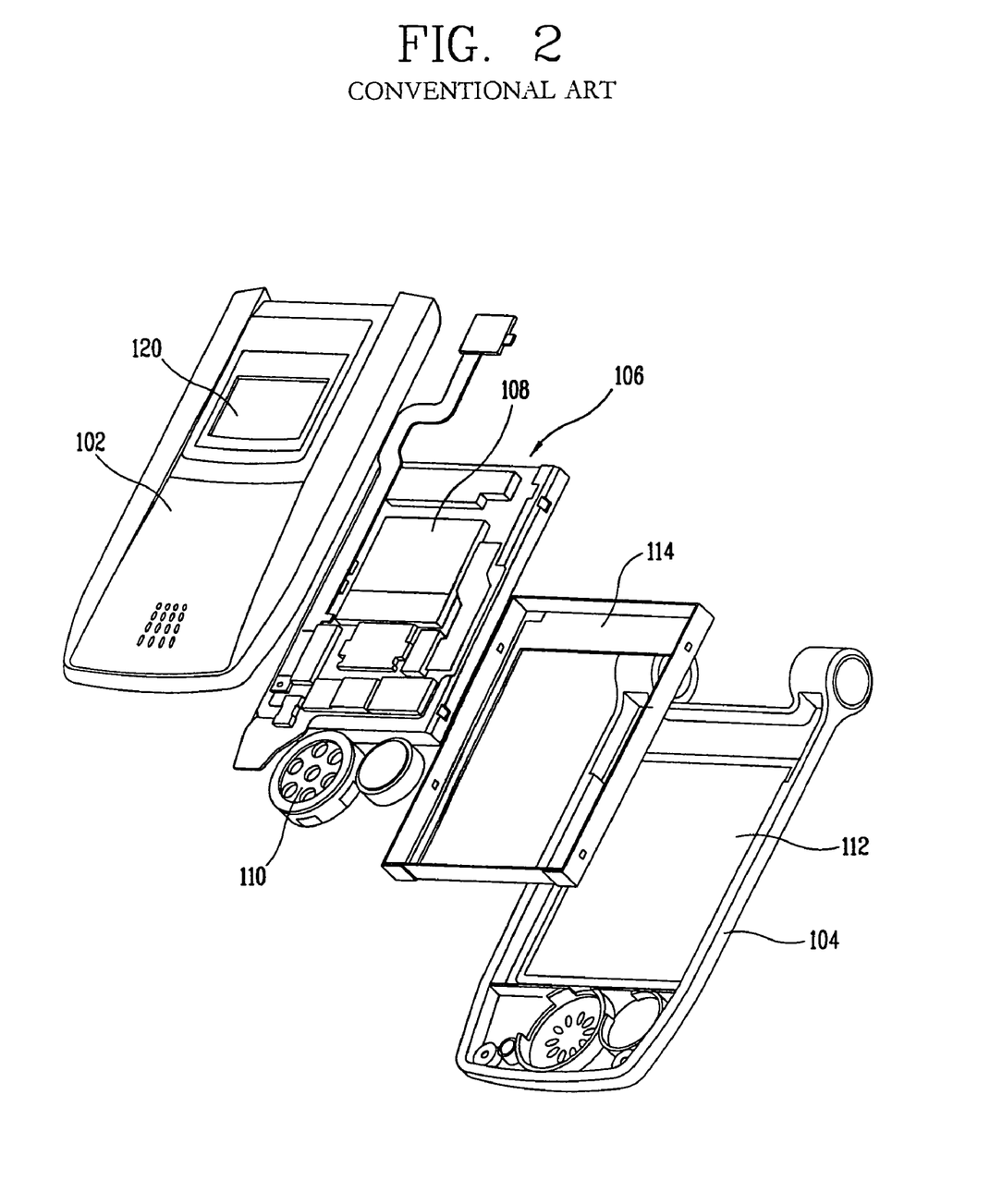
FIG. 2 is a disassembled perspective view of a conventional art mobile terminal.
Figure 3:
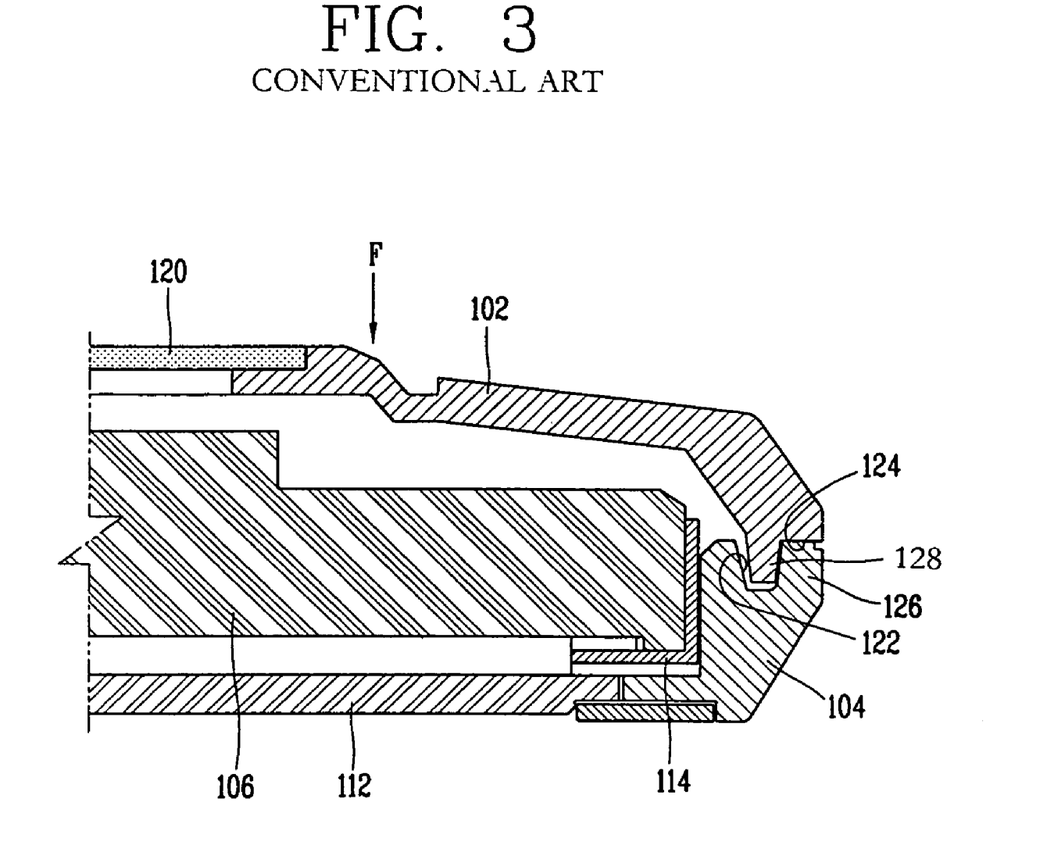
FIG. 3 is a sectional view of a conventional art foldable type mobile terminal in a folded state.

FIG. 2 is a disassembled perspective view of a mobile terminal in accordance with the conventional art, while FIG. 3 is a sectional view of a folder engagement mechanism of a mobile terminal in accordance with the conventional art. The folder portion 10 of the conventional mobile terminal includes an upper cover 102 which forms an outer surface of the terminal, and a lower cover 104 which engages with the upper cover 102 and which is rotatably connected to a body (not shown) of the mobile terminal. A printed circuit board 106 which has a sub LCD 108 mounted on a front surface thereof, a main LCD (not shown) mounted on a rear surface thereof, and a receiver 110 mounted at one side thereof, is mounted between the upper cover 102 and the lower cover 104.

A transparent sub window 120 is provided in the upper cover 102 to allow a user to view information displayed on the sub LCD 108, and a transparent main window 112 is mounted in the lower cover 104 to allow a user to view information displayed on the main LCD. A mounting panel 114 for mounting the printed circuit board 106 is located at an inner side of the lower cover 104.

The upper cover 102 and the lower cover 104 are typically attached with a bolt. A guide protrusion 128 is formed at an edge of a lower surface of the upper cover 102 and is inserted into a guide groove 122 formed at an edge of an upper surface of the lower cover 104 in order to align the upper cover 102 and the lower cover 104. An upper contact portion 124 is formed on a side surface of the guide protrusion 120, and a lower contact portion 126 is formed on a side surface of the guide groove 122 so as to make contact when the upper cover 102 and the lower cover 104 are assembled.

Assembly of the foldable type mobile terminal according to the conventional art will now be described. First, the mounting panel 114 is mounted onto an inner surface of the lower cover 104. Next, the printed circuit board 106 with the LCD 108 mounted thereon is mounted on an inner side of the mounting panel 114. The upper cover 102 is then connected to an upper surface of the lower cover 104, thereby completing the assembly of the conventional art foldable type mobile terminal.

When assembled, the guide protrusion 128 is inserted into the guide groove 122 so as to properly align the upper cover 102 and the lower cover 104. If the guide protrusion 128 is properly fitted in the guide groove 122, and the upper cover 102 and the lower cover 104 are properly aligned, then the upper contact portion 124 and the lower contact portion 126 will make mutual contact, thereby supporting an engaged state of the upper cover 102 and the lower cover 104.

However, if an external impact is applied to the upper cover 102 in the direction of arrow F in FIG. 3, a concentrated load is applied to the upper contact portion 124 and the lower contact portion 126. Because the contact area which supports the engaged state of the upper cover 102 and the lower cover 104 is small, it is easily deformed by this type of external impact. In this case, the upper cover 102 can be deformed and come in physical contact with the LCD 108, thereby damaging the LCD 108.

SUMMARY OF THE INVENTION

An object of the invention is to solve at least the above problems and/or disadvantages and to provide at least the advantages described hereinafter.

To achieve these and other advantages, in whole or in part, and in accordance with the purpose of the invention, as embodied and broadly described herein, there is a folder type mobile terminal in accordance with an embodiment of the invention comprising a folder portion, comprising an upper cover and a lower cover, wherein the upper cover and the lower cover are configured to be attached so as to form a space therebetween, a display mounted in the space formed between the upper and lower covers, and an impact dispersing mechanism formed at edges of the upper and lower covers and configured to disperse to the lower cover an impact applied to the upper cover.

To further achieve these and other advantages, in whole or in part, and in accordance with the purpose of the invention, as embodied and broadly described herein, there is a folder type mobile terminal in accordance with an embodiment of the invention comprising a first cover configured to be attached to a second cover so as to form a space therebetween, a display installed in the space formed between the first and second covers, and an impact dispersing device formed on the first and second covers and configured to transfer to the second cover a force applied at the first cover.

To further achieve these and other advantages, in whole or in part, and in accordance with the purpose of the invention, as embodied and broadly described herein, there is an impact dispersing device for a mobile terminal in accordance with an embodiment of the invention comprising a first rib formed at an edge of a first housing, a second rib formed at an edge of a second housing, wherein the second housing is configured to be attached to the first housing to form a space therebetween, a display mounted in the space formed between the first housing and the second housing, a first gap of substantially constant height formed between a surface of the first rib and a surface of the second rib, and a second gap of substantially constant height formed between an upper surface of the display and a lower surface of the first housing, wherein the height of the second gap is greater than the height of the first gap when the first housing is attached to the second housing.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 4:
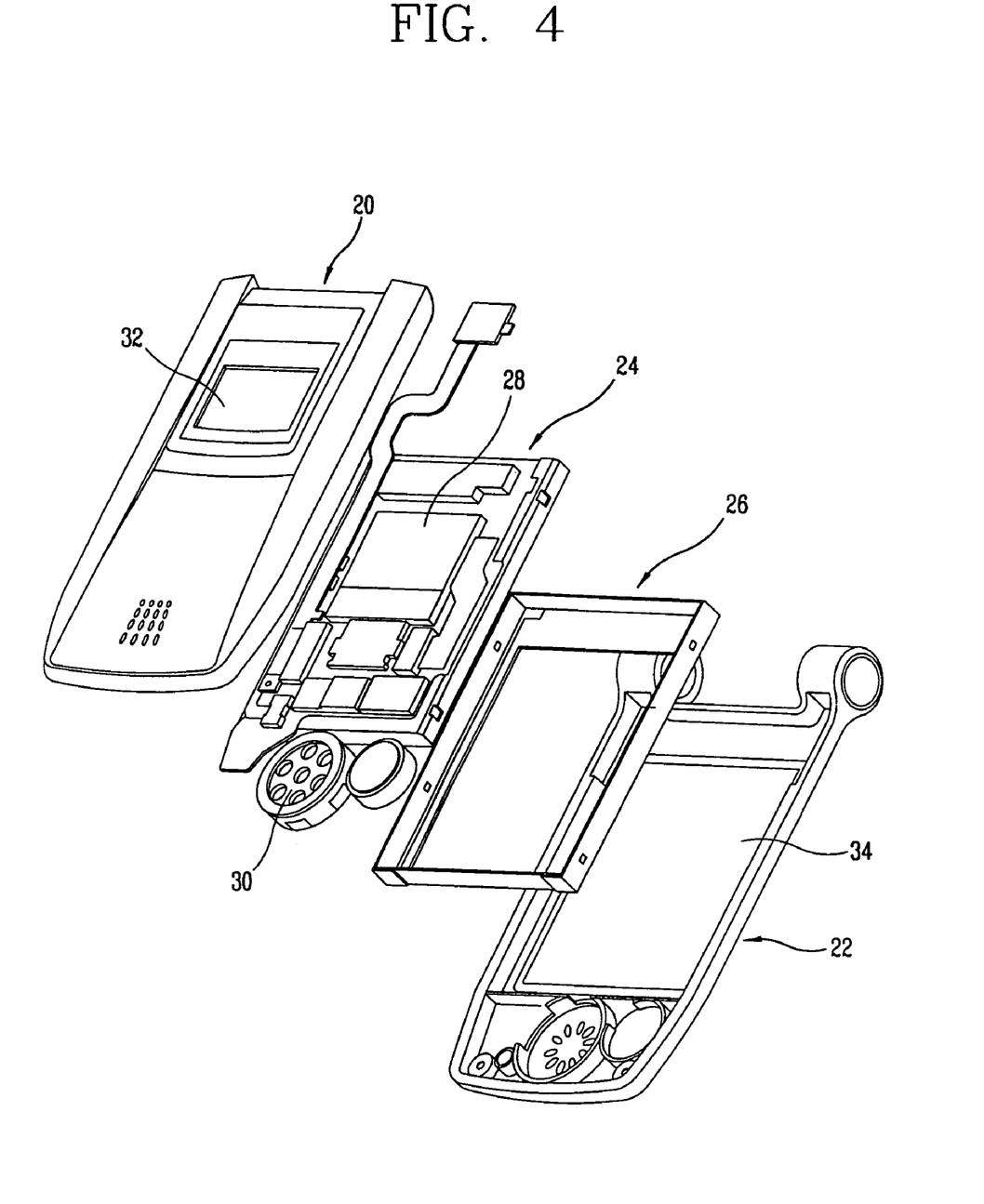
FIG. 4 is a schematic disassembled perspective view of a mobile terminal according to an embodiment of the invention.
Figure 5:
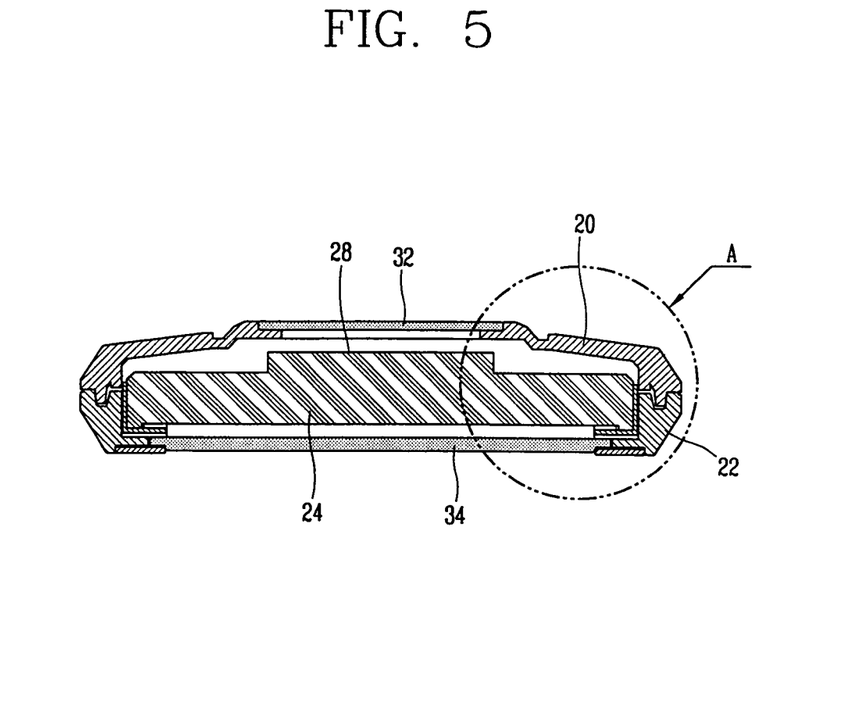
FIG. 5 is a schematic sectional view of a foldable type mobile terminal in a folded state according to an embodiment of the invention.

As shown in FIGS. 4 and 5, a folder portion of a mobile terminal according to an embodiment of the invention includes an upper cover 20 which forms an outer surface of the terminal, and a lower cover 22 which is attached to the upper cover 20 and which is configured to be rotatably coupled to a main body of the mobile terminal (not shown). A printed circuit board 24 which has a sub display 28, such as a sub LCD, at a front surface thereof, a main display (not shown), such as a LCD, at a rear surface thereof, and a receiver 30 configured to generate sound at one side thereof is mounted between the upper cover 20 and the lower cover 22. A mounting panel 26 is attached to an inner side of the lower cover 22 to accommodate the printed circuit board 24. A transparent sub window 32 through which a user can view information displayed on the sub display 28 is mounted in the upper cover 20. A transparent main window 34 through which a user can view information displayed on the main display is mounted in the lower cover 22.

A guide protrusion 50 is formed at an edge of a lower surface of the upper cover 20, and a guide groove 52 is formed at an edge of an upper surface of the lower cover 22. The guide protrusion 50 and guide groove 52 serve to properly align the upper cover 20 and the lower cover 22 when they are assembled. The guide protrusion 50 extends in a longitudinal direction from both edges of the upper cover 20. Likewise, the guide groove 52 is formed with a constant depth and extends in a longitudinal direction from both edges of the lower cover 22. If the guide protrusion 50 is properly inserted into the guide groove 52 when the upper cover 20 and the lower cover 22 are assembled, a proper assembly position of the upper cover 20 and the lower cover 22 is achieved.

A support area is formed at an edge of a lower surface of the upper cover 20 and at an edge of an upper surface of the lower cover 22. This support area comprises a first supporting portion 58 formed at an outer side of the guide protrusion 50, and a second supporting portion 60 formed at an outer side of the guide groove 52 and configured to contact the first supporting portion 58. If the upper cover 20 and the lower cover 22 are assembled, the first supporting portion 58 comes into contact with the second supporting portion 60, thereby maintaining the assembled state between the upper cover 20 and the lower cover 22.

Figure 6:
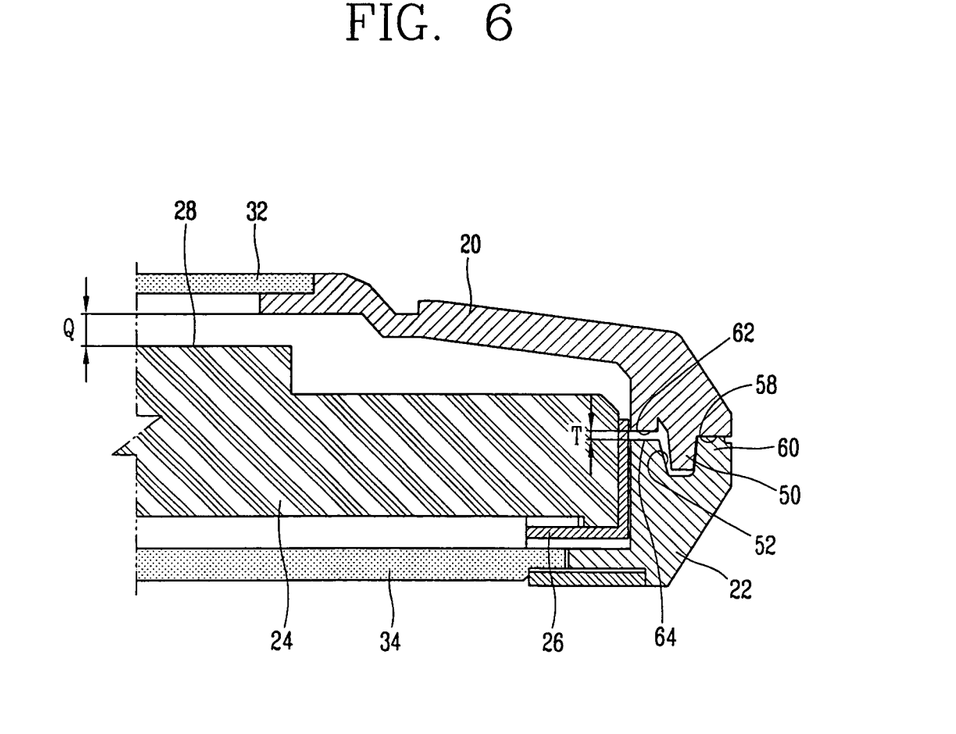
FIG. 6 is an enlarged view of 'A' of FIG. 5.

An impact dispersing mechanism prevents the display 28 from being damaged when a force F is applied to the upper cover 20. The impact dispersing mechanism disperses the force to the lower cover 22 and maintains an adequate clearance between the upper cover and the display. The impact dispersing mechanism is formed at an edge of a lower surface of the upper cover 20 and at an edge of an upper surface of the lower cover 22, and as shown in FIG. 6, comprises a first rib 62 having a constant cross section which protrudes from an edge of a lower surface of the upper cover 20, and a second rib 64 having a constant cross section which protrudes from an edge of an upper surface of the lower cover 22 and faces the first rib 62. The first rib 62 is formed at an inner side of the guide protrusion 50 with a length shorter than that of the guide protrusion 50. The second rib 64 is formed at an inner side of the guide groove 60 with a constant length and faces the first rib 62. Surfaces of the first rib 62 and the second rib 64 form a constant gap T when the upper cover 20 and the lower cover 22 are assembled, as shown in FIG. 6. The gap T is preferably narrower than a gap Q between the upper cover 20 and the display 28, as shown in FIG. 6.

Assembly of the folder type mobile terminal according to embodiments of the invention will now be described. First, the mounting panel 26 is mounted on the lower cover 22, and the printed circuit board 24, to which the display 28 is attached, is mounted in the mounting panel 26. Next, the upper cover 20 is positioned above the printed circuit board 24, and the upper cover 20 and the lower cover 22 are secured to each other, thereby completing the assembly process. At this time, the guide protrusion 50 of the upper cover 20 is inserted into the guide groove 52 of the lower cover 22, thereby aligning an assembly position between the upper cover 20 and the lower cover 22.

Figure 7:
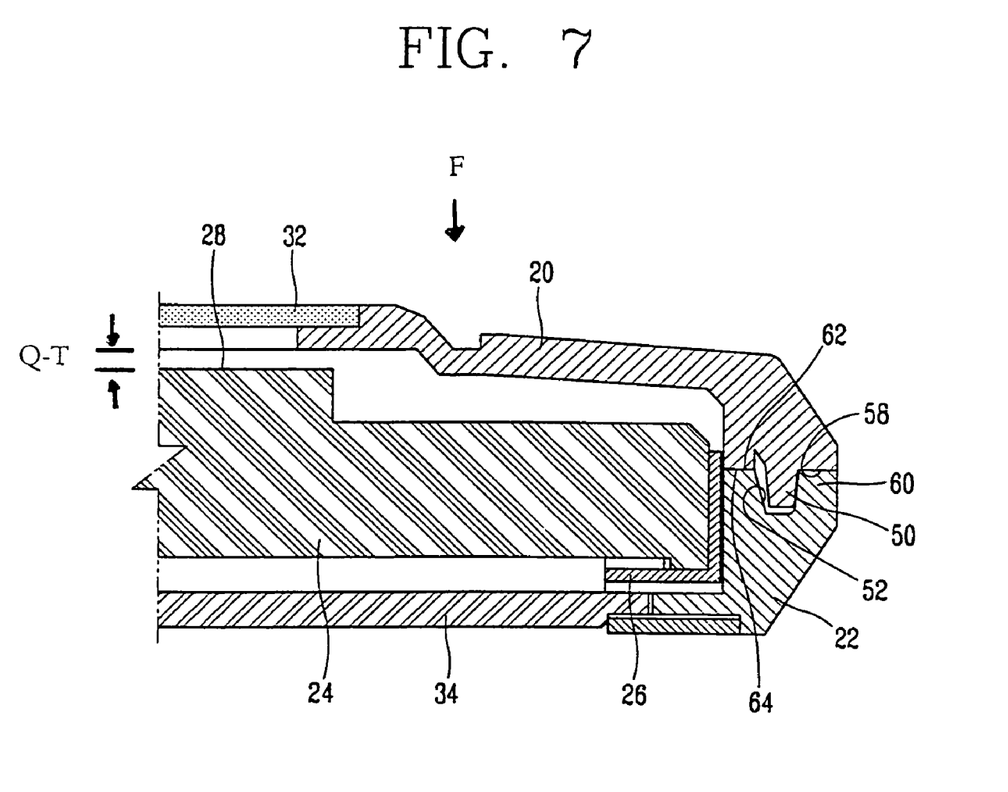
FIG. 7 is a schematic sectional view of a foldable type mobile terminal in a folded state to which an impact has been applied according to an embodiment of the invention.

When assembled in this manner, if an impact is applied to the upper cover 20 as shown by arrow F in FIG. 7, an intensive load is applied at areas of contact between the upper cover 20 and the lower cover 22. This causes the opposing surfaces of the first rib 62 and the second rib 64 to come into contact with each other, and thus the impact applied to the upper cover 20 is dispersed into the lower cover 22 through the first rib 62 and the second rib 64, thereby minimizing damage to the display 28. More particularly, if an impact such as force a F is applied to the upper cover 20, an intensive load is generated at the first rib 62, which is in contact with the second rib 64. Thus, the impact applied to the upper cover 20 is dispersed into the lower cover 22, thereby preventing damage to the display 28.

Additionally, as stated earlier, the distance T between the first rib 62 and the second rib 64 is preferably less than the distance Q between the upper cover 20 and the display 28. Therefore, when a force F is applied to the upper cover 20 and the upper cover 20 is forced in a direction toward the lower cover 22, the positioning of the first rib 62 and the second rib 64 limits movement of the upper cover to a distance not greater than T. Thus, an adequate gap of not less than Q-T is maintained between the upper cover 20 and the display 28, preventing damage to the display 28.

The folder type mobile terminal according to embodiments of the invention is capable of preventing a display, such as a LCD, mounted in a folder from being damaged when an external impact is applied to an upper cover of the mobile terminal. That is, the impact is dispersed to a lower case by an impact dispersing mechanism installed between the upper cover and the lower cover.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal, comprising:
a first body having:
an upper cover and a lower cover, wherein the upper cover and the lower cover are configured to be assembled together so as to form an enclosed space therebetween, and wherein the upper cover and the lower cover respectively have supporting portions that come into contact with each other to maintain an assembled state between the upper cover and the lower cover;
a display assembly mounted in the enclosed space formed between the upper and lower covers; and
an impact dispersing mechanism formed at edges of the upper and lower covers and configured to disperse to the lower cover an impact applied to the first body wherein the impact dispensing mechanism comprises a first portion attached to the upper cover and a second portion attached to the lower cover and wherein predetermined clearance in the form of an open air gap is maintained between the first portion and the second portion prior to an impact being applied to the first body.

2. The mobile terminal of claim 1, wherein the display assembly comprises a printed circuit board, and wherein the printed circuit board is configured to be mounted in the space formed between the upper and lower covers.

3. The mobile terminal of claim 1, wherein the first portion comprises at least one first rib formed to protrude a constant width at an edge of the upper cover, and the second portion comprises at least one second rib facing the first rib and formed to protrude a constant with at an edge of the lower cover.

4. The mobile terminal of claim 3, further comprising a guide protrusion formed at both edges of the upper cover, and a guide groove formed at both side edges of the lower cover, wherein the guide protrusion and the guide groove are configured to properly align the upper and lower covers when assembled.

5. The mobile terminal of claim 4, wherein at least one first rib has a constant cross-sectional area and is formed at an inner side of each guide protrusion, and at least one second rib has a constant cross-sectional area and is formed at an inner side of each guide groove.

6. The mobile terminal of claim 3, wherein the first rib is formed at both side edges of the upper cover and the second rib is formed at both side edges of the lower cover.

7. The mobile terminal of claim 3, wherein the clearance formed between the at least one first rib and the at least one second rib prior to an impact being applied to the upper cover is narrower than clearance formed between the upper cover and the display prior to an impact being applied to the upper cover.

8. The mobile terminal of claim 1, further comprising:
a second body configured to be rotatably attached to the first body.

9. A folder type mobile terminal, comprising:
a main body; and
a folder portion configured to be rotatably attached to the main body, the folder portion comprising:
a first cover configured to be attached to a second cover so as to form a space therebetween;
a display installed in the space formed between the first and second covers; and
an impact dispersing device formed on the first and second covers and configured to transfer to the second cover a force applied to the first cover wherein the impact dispensing device comprises a first portion attached to the first cover and a second portion attached to the second cover and wherein a predetermined clearance in the form of an open air gap is maintained between the first portion and the second portion to a force being applied to the first cover.

10. The mobile terminal of claim 9, wherein the display is mounted on a printed circuit board, and wherein the printed circuit board is configured to be installed in the space formed between the first and second covers.

11. The mobile terminal of claim 9, wherein the first portion comprises at least one first rib formed at an edge of the first cover and the second portion comprises at least one second rib facing the first rib and formed at an edge of the second cover.

12. The mobile terminal of claim 11, further comprising at least one guide protrusion formed at an edge of the first cover, and at least one guide grove configured to correspond to the guide protrusion formed at the edge of the second cover.

13. The mobile terminal of claim 11, wherein a first gap of substantially constant clearance is formed between the upper surface of the display and the lower surface of the first cover when the first cover and the second cover are attached.

14. The mobile terminal of claim 13, wherein the clearance between the upper surface of the display and the lower surface of the first cover is larger than the clearance between the first and second portions of the impact dispensing device prior to a force being applied to the first cover.

15. The mobile terminal of claim 14, wherein the clearance between the first and second portions of the impact dispensing device is reduced when a force is applied to the first cover.

16. The mobile terminal of claim 15, wherein the clearance between the first and second portions of the impact dispensing device is reduced to substantially zero when a lower surface of the first portion contacts an upper surface of the second portion when a force is applied to the first cover, and wherein a clearance between the upper surface of the display and the lower surface of the first cover is maintained.

17. The mobile terminal of claim 11, wherein a first rib is formed at opposite side edges of the first cover, and wherein a second rib is formed at opposite side edges of the second cover.

18. An impact dispersing device for a folder portion of a mobile terminal, the mobile terminal comprising a main body and the folder portion which is rotatably attached to the main body, the impact dispensing member comprising:
at least one first rib formed at an edge of a first housing of the folder portion;
at least one second rib formed at an edge of a second housing of the folder portion, wherein the second housing is configured to be attached to the first housing to form a space therebetween; and
a display mounted in the space formed between the first housing and the second housing, wherein a first open air gap of substantially constant height is formed between a lower surface of the at least one first rib and an upper surface of the at least one second rib, wherein a second gap of substantially constant height is formed between an upper surface of the display and a lower surface of the first housing, and wherein the height of the second gap is greater than the height of the first gap when the first housing is attached to the second housing.

19. The mobile terminal of claim 18, wherein the display comprises a liquid crystal display (LCD).

20. The impact dispersing device of claim 18, wherein the height of the second gap remains greater than the height of the first gap when an external force is applied to the first housing.

21. The impact dispersing device of claim 18, further comprising at least one guide protrusion formed at a side edge of the first housing, and at least one guide groove configured to correspond to the at least one guide protrusion and formed at a side edge of the second housing, wherein the at least one guide groove is further configured to engage the at least one guide protrusion when the first housing and the second housing are attached so as to properly align the first housing and the second housing.

22. The impact dispersing device of claim 21, wherein the at least one first rib has a constant cross sectional area at a section which is proximate to an inner side of the at least one guide protrusion, and wherein the at least one second rib has a constant cross section area at a section which is proximate to an inner side of the at least one guide groove.

23. A folder type mobile terminal comprising the impact dispersing device of claim 18.

* * * * *